No. 660,245. Patented Oct. 23, 1900.
J. BUNTE & W. SCRIMGEOUR, Jr.
HOSE CLAMP.
(Application filed July 26, 1900.)
(No Model.)
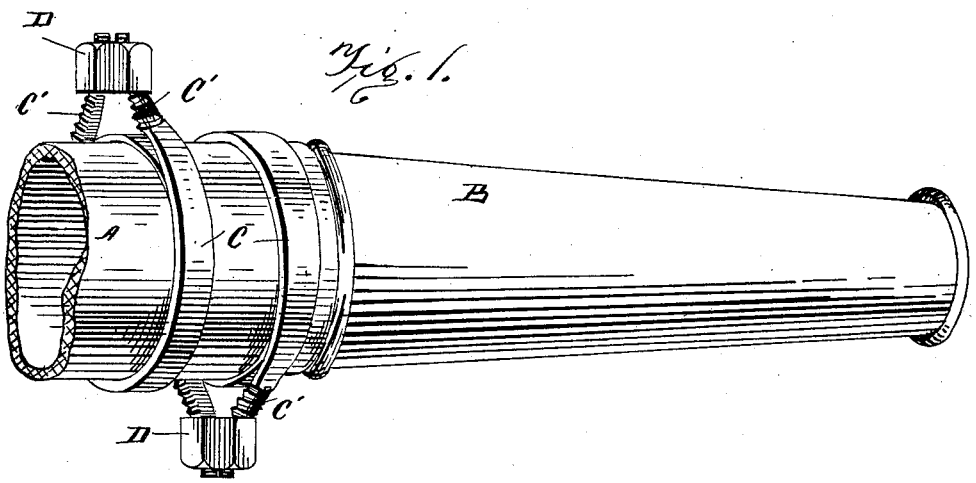
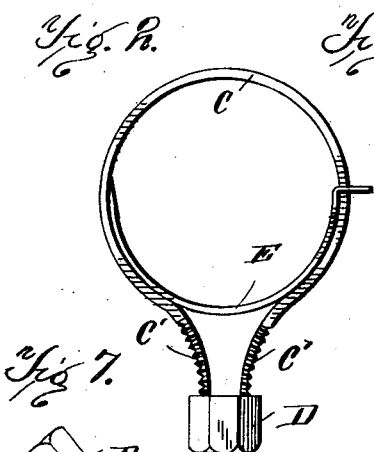
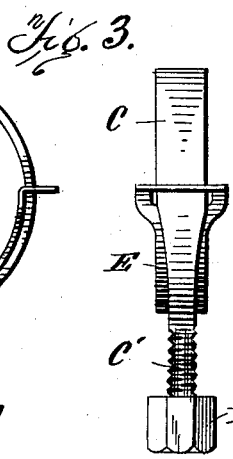
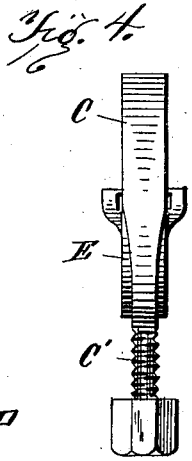
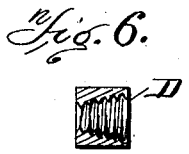
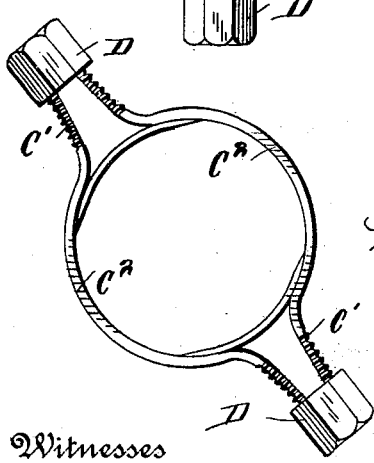
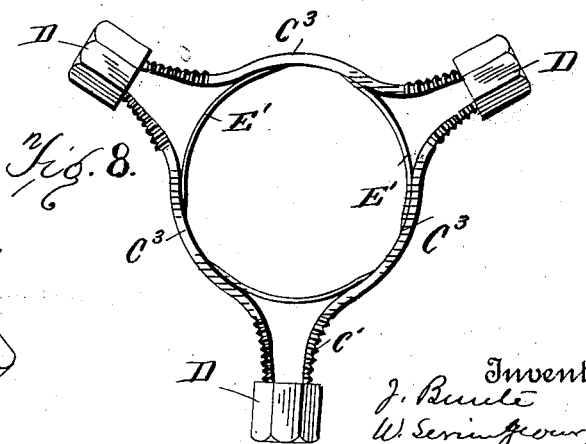
Witnesses
Charles K. Davies.
Charles J. Kappler
Inventors
J. Bunte
W. Scrimgeour Jr
By W. H. Bartlett
Attorney

UNITED STATES PATENT OFFICE.

JOHN BUNTE AND WILLIAM SCRIMGEOUR, JR., OF PORTSMOUTH, VIRGINIA.

HOSE-CLAMP.

SPECIFICATION forming part of Letters Patent No. 660,245, dated October 23, 1900.

Application filed July 26, 1900. Serial No. 24,915. (No model.)

*To all whom it may concern:*

Be it known that we, JOHN BUNTE and WILLIAM SCRIMGEOUR, Jr., residing at Portsmouth, in the county of Norfolk and State of Virginia, have invented certain new and useful Improvements in Hose-Clamps, of which the following is a specification, reference being had therein to the accompanying drawings.

This invention relates to tube-clamps especially intended to clamp flexible pipes, such as hose-pipe, to nozzles, rigid links, or other rigid connections.

The object of the invention is to make a simple and adjustable metallic clamp for the purpose described having features of novelty hereinafter claimed.

Figure 1 is a broken perspective view of a hose clamped to a nozzle by two of the clamps of this invention. Fig. 2 is a side elevation, and Figs. 3 and 4 end elevations, in reverse position of the clamp. Fig. 5 is an end view of clamp-strap and nut. Fig. 6 is a section of the nut. Figs. 7 and 8 are elevations of modifications of the clamp.

A indicates a flexible hose of any ordinary construction, and B a metallic nozzle or pipe to which the hose is attached.

C is the metallic band, constituting the body of the improved clamp. This band may be of iron, steel, copper, or other metal which is sufficiently flexible to bend around the hose. The band is preferably flat, as shown, but may depart somewhat from such form. The ends $C'$ $C'$ of such band are rounded and a segment of a screw-thread cut on the rounded face. The ends may taper, as shown in Figs. 1 and 8. The thread is on the outer face of the band when the same is coiled into a loop.

D indicates a nut of usual construction, except that the bore is tapered. The thread on the nut should be of the same pitch as on the ends $C'$ of the strap.

E is the inner bushing of the clamp. This is a curved piece of metal forming about an arc of the surface of the hose. The bushing E may be rigid, but is preferably slightly yielding. The bushing E may be held to the strap C by widening one end of the bushing, perforating the widened portion, and passing the strap C through such perforation; or the bushing may be otherwise connected, so as to be reasonably secure in its relation to the band C.

The band C is looped around the hose, the ends extending to one side thereof, as shown in Fig. 1. The bushing E extends across the space where the outwardly-turned ends $C'$ of the band have an opening between. Now by applying the nut and turning the same to clamp the band a most powerful pressure may be applied. The tapered form of the nut prevents the cramping of the band in such manner as to make a sharp angle, so that there is little danger of breaking the band. The ends of the band tend to spring outwardly, so as to give good engagement with the nut and cause the same to move on the threaded ends of the band much the same as a nut would move on a solid screw-bolt.

Figs. 7 and 8 show modifications wherein the band is made up of sections $C^2$ or $C^3$, each being less than the length needful to surround the hose, but in other respects like the band heretofore described. The mode of application is apparent. Bushing-pieces $E'$ span each break in the clamp.

The bushings may be shorter where three are used, as in Fig. 8, but should be long enough to span the gap in the clamp.

We claim—

1. A hose-clamp consisting of a metallic band having screw-segments on its end portions, a nut engaging such end portions, and a bushing extending across the opening below the nut.

2. A hose-clamp consisting essentially of a metallic band with threaded end portions, a bushing having a hole through which one end of the band passes, and a nut with tapered thread engaging the threaded ends of the band, all substantially as described.

In testimony whereof we affix our signatures in presence of two witnesses.

JOHN BUNTE.
WILLIAM SCRIMGEOUR, JR.

Witnesses:
BERNARD A. GALLAGHER,
ROBERT L. WILLIAMS.